United States Patent
Schnittger et al.

(10) Patent No.: US 11,267,447 B2
(45) Date of Patent: Mar. 8, 2022

(54) ELECTROPNEUMATIC PARKING BRAKE CONTROL DEVICE, AND BRAKING SYSTEM OF A VEHICLE

(71) Applicant: KNORR-BREMSE Systeme fuer Nutzfahrzeuge GmbH, Munich (DE)

(72) Inventors: Karsten Schnittger, Munich (DE); Max Michalski, Neubiberg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 179 days.

(21) Appl. No.: 16/645,318

(22) PCT Filed: Aug. 24, 2018

(86) PCT No.: PCT/EP2018/072885
§ 371 (c)(1),
(2) Date: Mar. 6, 2020

(87) PCT Pub. No.: WO2019/048263
PCT Pub. Date: Mar. 14, 2019

(65) Prior Publication Data
US 2021/0162972 A1  Jun. 3, 2021

(30) Foreign Application Priority Data

Sep. 7, 2017  (DE) ...................... 10 2017 120 691.4

(51) Int. Cl.
*B60T 13/68* (2006.01)
*B60T 13/66* (2006.01)
(Continued)

(52) U.S. Cl.
CPC .......... *B60T 13/683* (2013.01); *B60T 13/662* (2013.01); *B60T 13/263* (2013.01); *B60T 13/385* (2013.01);
(Continued)

(58) Field of Classification Search
CPC .... B60T 13/683; B60T 15/041; B60T 13/662; B60T 13/263; B60T 13/385; B60T 2270/402; B60T 2270/413; B60T 2400/81
See application file for complete search history.

(56) References Cited

U.S. PATENT DOCUMENTS

2010/0072810 A1  3/2010  Bensch et al.
2014/0103237 A1  4/2014  Herges

FOREIGN PATENT DOCUMENTS

DE       102 47 812 C1    10/2003
DE   10 2006 041 012 A1    3/2008
(Continued)

OTHER PUBLICATIONS

Japanese language Office Action issued in Japanese Application No. 2020-513742 dated Mar. 1, 2021 with English translation (six (6) pages).
(Continued)

*Primary Examiner* — Pamela Rodriguez
(74) *Attorney, Agent, or Firm* — Crowell & Moring LLP (57) ABSTRACT

An electropneumatic parking brake control device controls a parking brake including at least one spring brake actuator. The control device includes a relay valve with a control chamber and a vent. The control chamber can be connected to the vent via at least one second throttle element and/or at least one third throttle element depending on the position of the relay piston.

18 Claims, 4 Drawing Sheets

(51) Int. Cl.
  B60T 13/26 (2006.01)
  B60T 13/38 (2006.01)
  B60T 15/04 (2006.01)

(52) U.S. Cl.
  CPC ....... *B60T 15/041* (2013.01); *B60T 2270/402* (2013.01); *B60T 2270/413* (2013.01); *B60Y 2400/81* (2013.01)

(56) References Cited

FOREIGN PATENT DOCUMENTS

| | | | |
|---|---|---|---|
| DE | 10 2007 061 908 A1 | 6/2009 | |
| DE | 10 2006 055 570 B4 | 5/2010 | |
| DE | 10 2009 016 983 A1 | 10/2010 | |
| DE | 10 2009 059 816 B3 | 4/2011 | |
| DE | 10 2011 101 438 A1 | 11/2012 | |
| DE | 10 2015 107 125 A1 | 11/2016 | |
| DE | 10 2015 116 317 A1 | 3/2017 | |
| DE | WO-2017/071991 A | * 5/2017 | |
| EP | 1 410 970 B1 | 3/2008 | |
| EP | 2 099 666 B1 | 6/2010 | |
| EP | 2 239 173 B1 | 3/2016 | |
| EP | 3 129 264 B1 | 4/2018 | |
| EP | 3 292 030 B1 | 7/2019 | |
| EP | 3 356 192 B1 | 7/2019 | |
| WO | WO 2015/154787 A1 | 10/2015 | |
| WO | WO 2016/177475 A1 | 11/2016 | |

OTHER PUBLICATIONS

International Search Report (PCT/ISA/210) issued in PCT Application No. PCT/EP2018/072885 dated Dec. 10, 2018 with English translation (five (5) pages).

German-language Written Opinion (PCT/ISA/237) issued in PCT Application No. PCT/EP2018/072885 dated Dec. 10, 2018 (eight (8) pages).

German-language Office Action issued in German Application No. 10 2017 120 691.4 dated Jun. 13, 2018 (eight (8) pages).

Hindi-language Office Action issued in Indian Application No. 202037010576 dated Mar. 12, 2021 with partial English translation (five (5) pages).

International Preliminary Report on Patentability (PCT/IB/326 & PCT/IB/373) issued in PCT Application No. PCT/EP2018/072885 dated Mar. 19, 2020, including English translation of document C2 (German-language Written Opinion (PCT/ISA/237) previously filed on Mar. 6, 2020) (nine pages).

* cited by examiner

ELECTROPNEUMATIC PARKING BRAKE CONTROL DEVICE, AND BRAKING SYSTEM OF A VEHICLE

BACKGROUND AND SUMMARY OF THE INVENTION

The invention relates to an electropneumatic parking brake control device for controlling a parking brake comprising at least one spring brake actuator.

In commercial vehicles, including tractor vehicle-trailer combinations as well as rail vehicles, parking brakes are equipped with spring brake actuators which in the release position apply pressurized air to a spring compression space and as a result keep the spring tension, while for the purpose of braking the spring compression space is vented, i.e. connected to atmospheric pressure, so that the brake cylinder generates a braking force under the effect of the spring.

Both purely pneumatically operated parking brakes are known, which are operated with a bistable parking brake valve which is to be activated by the driver, as well as electro-pneumatic systems with a bistable electro-mechanical valve, for example a pneumatic relay valve, which is controlled by an electro-mechanical, bistable solenoid valve. Both valve positions for "parking brake" and "release" have to be "stable" here, i.e. have to remain in the respectively selected end position without the action of a person or of electrical energy.

In the prior art, the bistability is therefore ensured either purely pneumatically with relay valves connected downstream and a plurality of activation pistons and control pistons, for example according to DE 10 2009 016 983 A1 or DE 10 247 812 C1, which gives rise to a high level of expenditure and a large installation space or by means of bistable solenoid valves with a relay valve connected downstream, as is described in DE 10 2006 055 570 B4. However, bistable solenoid valves are expensive and susceptible to faults in practice.

From WO 2015/154787 A1 of the generic type it is known to implement the bistability in an electrical parking brake with a relay valve by means of a feedback line of the relay valve outlet to the control space of the relay valve, wherein a throttle is arranged in the feedback path. This provides bistable behavior of the relay valve, which maintains the currently assumed position such as "park" or "drive" without a power supply of the solenoid valve device which controls the relay valve. The solenoid valve device comprises two 2/2-way solenoid valves, an inlet solenoid valve and an outlet solenoid valve and is used to aerate or vent a control chamber of the relay valve. In this context, the relay valve piston of the relay valve is in the venting position for the "park" state if the control pressure in the control chamber is below a specific threshold value. In this context, the working connection of the relay valve is connected to a venting means. The control chamber is then connected to the venting means via the throttle in the feedback line and also via the working connection of the relay valve. In contrast, the relay valve piston of the relay valve is in the aeration position for the "drive" state if the control pressure in the control chamber is above a specific threshold value. The working connection of the relay valve is connected to the pressure supply. The control chamber is also connected to the pressure supply via the throttle in the feedback line. For the "stepped braking" state, the inlet solenoid valve and the outlet solenoid valve are controlled in such a way that a pressure, which is between 0 bar and the supply pressure, is brought about in the control chamber of the relay valve. The relay valve piston is then in some kind of intermediate position between the aeration position and the venting position. A pressure which is proportional to the control pressure which is present in the control chamber is modulated for the spring brake actuators at the working outlet of the relay valve. Braking can then be carried out with the parking brake within the scope of an emergency braking function or auxiliary braking function even during travel, with a braking force which can be adjusted by means of the actuation element of the parking brake.

However, the occurrence of a power failure during the application of the emergency braking function or auxiliary braking function can give rise to different brake pressures in the spring brake actuators depending on which brake pressure was currently present at the time of the power failure. In this context, various cases are conceivable.

a) On the one hand, in the event of a power failure so much control pressurized air can flow into the control chamber of the relay valve via the throttle in the feedback line that the supply pressure is brought about both in the control chamber and in the spring brake actuators. The "drive" state is then present in a stable form and the relay valve piston is in the aeration position.

b) Furthermore, in the event of a power failure in the control chamber of the relay valve and in the spring brake actuators the same pressure can be brought about so that equalization flows then do not occur via the throttle in the feedback line. The instantaneous pressure in the spring brake actuators is then retained so that neither the "drive" state nor the "park" state is in a stable form. The relay valve piston is then in an intermediate position as described above.

c) Furthermore, in the event of a power failure pressurized air can flow from the control chamber into the spring brake actuators via the throttle in the feedback line so that both the control chamber and the spring brake actuators are vented. The "park" state is then present in the stable form and the relay valve piston is in the venting position.

In this context, the above case b) turns out to be problematic because in the event of a power failure during the execution of the emergency braking function or auxiliary braking function the pressure which is then present is retained in the spring brake actuators. In contrast, the "park" state can then no longer be achieved.

In view of the above, the invention is based on the object of developing an electropneumatic parking brake control device of the type mentioned at the beginning in such a way that in the case of auxiliary braking the "park" state can be assumed in a stable fashion with cost-effective means which take up little installation space, even after a power failure.

The invention is based on an electropneumatic parking brake control device for controlling a parking brake comprising at least one spring brake actuator, having a connection for the at least one spring brake actuator, a solenoid valve device which can be controlled by means of an electronic control device, a relay valve whose pneumatic control inlet is connected at one end to the solenoid valve device and at the other end to its working outlet and to the connection for the at least one spring brake actuator, a supply connection for at least one pressurized air supply which is connected at one end to the first solenoid valve device and at the other end to a supply inlet of the relay valve, a feedback line through which the working outlet and the pneumatic control inlet of the relay valve are connected to one another, wherein the relay valve has a control chamber which is connected to the pneumatic control inlet, at least one relay piston which is controlled by the pressure in the control chamber and activates a double seat valve, and a working chamber which is connected to the working outlet, wherein the relay piston is guided within a relay valve housing and bounds the control chamber and the working chamber, and the double seat valve comprises at least one inlet seat and at least one outlet seat, wherein when the outlet seat is opened, the working chamber is connected to a venting means, and when the inlet valve is opened said working chamber is connected to the supply inlet, and wherein at least one first throttle element is arranged in the feedback line in such a way that the working outlet and the pneumatic control inlet of the relay valve always have a throttled flow connection to one another, and wherein the control chamber of the relay valve is connected to the venting means via at least one second throttle element, specifically exclusively when the relay piston is in a venting position or in an intermediate position, but the connection of the control chamber to the venting means is interrupted by means of the at least one second throttle element if the relay piston is in an aeration position, wherein the venting position of the relay piston within the relay valve housing is characterized in that the outlet seat is completely opened and the inlet seat of the double seat valve is completely closed, and as a result a pressure arises at the connection for the at least one spring brake actuator, which pressure corresponds to an application pressure of the at least one spring brake actuator, at which pressure said actuator is completely applied, and wherein the aeration position of the relay valve within the relay valve housing is characterized in that the inlet seat is completely opened and the outlet seat is completely closed, and as a result a pressure arises at the connection for the at least one spring brake actuator, which pressure corresponds to a release pressure of the at least one spring brake actuator, at which pressure said actuator is completely released, and wherein an intermediate position of the relay piston within the relay valve housing is characterized in that a pressure arises at the connection for the at least one spring brake actuator, which pressure is higher than the application pressure but lower than the release pressure.

It is clear here that there are a plurality of intermediate positions of the relay piston, depending on the requested parking braking force within the scope of an emergency braking process or auxiliary braking process.

Therefore, for the purpose of feedback at least one first throttle element is arranged in the feedback line extending between the working outlet and the pneumatic control inlet of the relay valve, in such a way that the working outlet and the pneumatic control inlet of the relay valve always have a flow connection to one another. A feedback circuit in which the pressure at the working outlet of the relay valve or at the connection for the at least one spring brake actuator is fed back into the control inlet of the relay valve is brought about via the feedback line which is provided with the at least one first throttle element.

A throttle element is to generally be understood as an element which constricts the flow cross-section of the feedback line. In this context, the air mass flow through the throttle element is limited (in both directions of flow) to a value which is, for example, lower than the air mass flow, which without the throttle element, would flow through the line in which the throttle element is arranged. The flow cross-section which is made available by the throttle element is therefore smaller than the flow cross-section which is made available by the line.

According to the invention there is then provision that the control chamber of the relay valve is connected to the venting means via at least one third throttle element, specifically exclusively when the relay piston is in the venting position, but the connection between the control chamber and the venting means is interrupted by means of the at least one third throttle element if the relay piston is in the aeration position or in the intermediate position, and wherein the flow cross-section which is made available by the at least one third throttle element is larger than the flow cross-section which is made available by the at least one first throttle element, and the flow cross-section which is made available by the at least one second throttle element is smaller than the flow cross-section which is made available by the at least one first throttle element.

In WO 2015/154787 A1 of the generic type the purpose of the at least one second throttle element consists in avoiding undesired release of the parking brake in the event of possibly occurring leaks with respect to a region conducting a supply pressure, e.g. in the inlet solenoid valve, and therefore undesired release of the applied parking brake by virtue of the fact that according to the embodiment shown there in FIG. 9 the second throttle element is arranged on the relay piston in such a way that it vents the control chamber of the relay valve with a small cross-section for venting, if the relay piston is in a position in which it has not yet or not completely opened the inlet seat of the double seat valve.

Owing to the inventive configuration, the at least one second throttle element according to the invention present here is, however, assigned a different function. This is because with the at least one second throttle element, it is now ensured with respect to the case b) described above that in the event of a power failure during the execution of the emergency braking function or auxiliary braking function the "park" state can be assumed in a stable fashion in every case. With the at least one second throttle element it is now ensured that in the event of a power failure during the execution of the emergency braking function or auxiliary braking function the control pressure in the control chamber of the relay valve drops, as a result of which the brake pressure in the spring brake actuator also drops and accordingly the "park" state is assumed in a stable fashion.

This new function can be assumed by the at least one second throttle element on the basis of the presence of the at least one third throttle element and the ratios of the flow cross-sections which are made available by the, in total, at least three throttle elements, for which reason these features interact synergetically.

The function which is originally assigned to the at least one second throttle element in WO 2015/154787 A1, specifically avoiding undesired release of the parking brake in the case of possibly occurring leaks with respect to a region which conducts supply pressure, is now implemented in the present invention here by the at least one third throttle element.

The present invention here has accordingly found a way, which can be implemented with little expenditure, of assuming in every case the "park" state and/or the "park" state in a stable fashion (in this context) in the event of a power failure during the execution of the emergency braking function or auxiliary braking function and along with at the same time an indeterminate state of the parking brake. This is because the throttle elements are elements which can be configured in a simple way and which, in particular, do not require electrical control and are therefore failsafe.

For a person skilled in the art it is readily possible to configure the at least one first throttle element, the at least one second throttle element and the at least one third throttle element in such a way that the desired effects are set.

A particularly cost-effective and simple embodiment is obtained if the at least one second throttle element and/or the at least one third throttle element comprise at least one drilled through-hole in a wall of the relay piston or are formed by such a through-hole, wherein in addition an element which is secured to the relay valve housing is provided, which element interacts with the at least one second throttle element and/or with the at least one third throttle element in such a way that depending on the position of the relay valve within the relay valve housing the control chamber is connected to the venting means via the at least one second throttle element and/or via the at least one third throttle element, or such a connection is blocked.

In this context, in particular a flow cross-section or a throttle cross-section of the at least one second throttle element and/or of the at least one third throttle element can be formed by the at least one drilled through-hole in the relay valve piston.

According to one development, a region on this side of an end, facing the control chamber, of the element which is secured to the relay valve housing is connected to the control chamber, wherein a) if the at least one drilled through-hole projects at least partially beyond the end in the direction of the control chamber, the control chamber is connected to the venting means via the at least one second throttle element and/or via the at least one third throttle element, and b) if the at least one drilled through-hole does not project beyond the end in the direction of the control chamber, such a connection is blocked.

In other words, the relay piston with the at least one drilled through-hole which forms the at least one second throttle element and/or the at least one third throttle element forms a slider in a slider valve, wherein depending on the position of the slider (relay valve) with respect to the end, facing the control chamber, of the element which is secured to the relay valve housing a flow connection comes about or does not come about between the control chamber and the venting means. In this context, the element which is secured to the relay valve housing opens or closes the at least one drilled through-hole depending on the position of the relay valve piston. This configuration also contributes to cost-effective and simple implementation of the invention.

In particular, viewed in the axial direction of movement of the relay piston the second throttle element and the third throttle element can be arranged one behind the other, wherein the second throttle element then points toward the control chamber, and the third throttle element points away from the control chamber.

In particular, the element which is secured to the relay valve housing can comprise at least one relay piston seal which is secured to the relay piston housing and against which a lateral wall of the relay piston, in which then the at least one drilled through-hole is formed, forms a seal. Therefore, the relay piston seal satisfies an advantageous double function, specifically, on the one hand, its original sealing function and, on the other hand, an element of the slider valve.

In particular, drilled through-holes which respectively form the at least one second throttle element and/or the at least one third throttle element can also be arranged one next to the other, near to one another or also serially one behind the other and/or one next to the other when viewed in the direction of movement of the relay piston, and can, in particular, be formed on an outer lateral wall of the relay piston. The at least one drilled through-hole can run, in particular, radially and/or axially with respect to the relay piston or with respect to its direction of movement.

According to one development, the relay piston can be loaded into the venting position by spring means in which the outlet seat of the double seat valve which is controlled by the relay piston is opened and a working connection of the relay valve is connected to a venting means, which is conducive for stable assumption of the "park" state.

In particular, the electronic control device can be connected to an electrical parking brake signal connection for an electric parking brake signal generator, via which parking brake signal connection parking brake signals can be input into the electronic control device.

The electronic control device can also be connected to a signal connection for inputting signals, from which the electronic control device generates parking brake signals. Then, signals can also preferably be input, e.g. via a vehicle data bus, into this signal connection or else into the parking brake signal connection of the parking brake control device, from which signals the control device then generates parking brake signals itself. Such signals may be, in particular, signals which make it possible to detect a stationary state of the vehicle within the scope of a driver assistance system, such as a starting aid system, wherein, for example, when the stationary state of the vehicle is detected on the basis of the signals which are then vehicle stationary state signals, the electronic control device then generates a parking brake signal for applying the parking brake. Alternatively, signals which are input into the parking brake control device and from which the electronic control device of the parking brake control device then generates parking brake signals could originate from any other driver assistance systems, such as for example from an ACC (Adaptive Cruise Control) system in the event of the parking brake being used as an auxiliary brake during travel. In all these cases, the parking brake signals are therefore not generated automatically in accordance with activation of the parking brake signal generator but rather in accordance with one or more driver assistance systems.

Of course, the signals which are input into the parking brake control device and from which the electronic control device of the parking brake control device then generates parking brake signals can originate from an activation device which can be activated manually by the driver and with which at least the "park" and "drive" states can be brought about in accordance with the degree of activation of an activation element, and in particular also the magnitude of the applied parking brake force within the scope of the emergency braking function or auxiliary braking function.

For this purpose, this signal connection or the parking brake signal connection is then designed, for example, in such a way that it can be connected to a vehicle data bus in order to input signals, which have been conducted via the vehicle data bus, into the electronic control device which then generates parking brake signals there in accordance with these signals. The communication between the electronic control device and the vehicle data bus is then preferably bidirectional.

The solenoid valve device can particularly preferably be formed by two 2/2-way solenoid valves each with a closed position and an open position, wherein a first 2/2-way solenoid valve is connected as an inlet valve between the control inlet of the relay valve and the supply connection, and a second 2/2-way solenoid valve is connected between the control inlet of the relay valve and a pressure sink.

In this context, the first 2/2-way solenoid valve and the second 2/2-way solenoid valve can each have a currentless, spring-loaded closed position and an energized open position. Then, in the event of failure of the electrical energy supply, the control inlet of the relay valve is disconnected both from the supply connection and from the venting means or pressure sink so that control pressure air cannot pass from the supply connection to the relay valve or escape from it via the pressure sink.

Alternatively, the solenoid valve device can also comprise at least one 3/2-way solenoid valve.

Overall, this provides advantages with respect to a simple and cost-effective design, a low requirement for installation space and robust, proven technology, since the invention prefers the use of kit components such as 2/2-way solenoid valves and/or 3/2-way solenoid valves as well as relay valves.

According to one development there is provision that when a parking brake signal which represents a "drive" state is input into the electronic control device or generated in the electronic control device, the second 2/2-way solenoid valve is controlled into the closed position, and the first 2/2-way solenoid valve is firstly controlled into the open position. For example, through energization the first 2/2-way solenoid valve is therefore firstly switched into the open position over a certain time period, while the second 2/2-way solenoid valve remains in the closed position. After the expiry of the specific time period which is necessary for the pressure at the connection for the at least one spring brake accumulator to have reached the full release pressure of the spring brake accumulator, the first 2/2-way solenoid valve is then controlled into the closed position. The control inlet is therefore then only connected to the working outlet in the throttled fashion. A slight leak to a pressure sink, which possibly results e.g. from a defect, would be compensated by means of the inlet seat of the relay valve.

When a parking brake signal which represents an "activate parking brake with a specific brake pressure value" state is input into the electronic control device or generated in the electronic control device, the latter controls the first 2/2-way solenoid valve and/or the second 2/2-way solenoid valve into the closed position or into the open position depending on the the respective brake pressure value. This is the case, in particular, within the scope of an auxiliary braking operation or emergency braking operation in which the parking brake has to replace the service brake or assist it.

In order to increase the pressure at the connection for the at least one spring brake accumulator, for example the first 2/2-way solenoid valve is controlled into the open position so that the pressure at the control inlet of the relay valve and therefore also at the connection for the at least one spring brake accumulator is increased.

In order to lower the pressure at the connection for the at least one spring brake accumulator, for example the second 2/2-way solenoid valve is switched into the open position so that the pressure at the control inlet of the relay valve and therefore also at the connection for the at least one spring brake accumulator is reduced.

In the first case, the electronic control device can control the first 2/2-way solenoid valve, and in the second case the second 2/2-way solenoid valve, alternately or in a pulsed fashion into the closed position and into the open position over a period of time which is relatively long in comparison with the latter, in order to achieve a ramp-shaped or gradual increase in pressure or a drop in pressure which is advantageous particularly for sensitive metering or for regulation of the parking brake force or of the braking brake pressure, in particular within the scope of an auxiliary braking operation or emergency braking operation.

The flow of air through the at least one first throttle element, which possibly arises depending on a current pressure difference between the working outlet and the control inlet of the relay valve and a slight leak to a pressure sink or to the supply pressure, which possibly arises e.g. as a result of a defect, can be compensated by brief energization of the 2/2-way solenoid valve which acts in the opposite direction.

According to one development, when a parking brake signal which represents a "park" state is input into the electronic control device or generated in the electronic control device, the latter can control the first 2/2-way solenoid valve into the closed position, and can firstly control the second 2/2-way solenoid valve into the open position and then into the closed position. For example, by energization, the second 2/2-way solenoid valve is thus firstly switched into the open position over a certain time period, while the first 2/2-way solenoid valve remains in the closed position. After expiry of the specific time period which is necessary for the pressure at the connection for the at least one spring brake actuator to have dropped at least so far that the relay valve still remains in the venting position even after switching off of the second 2/2-way solenoid valve, the second 2/2-way solenoid valve is then controlled into the closed position. The control inlet is thus connected to the working outlet only in a throttled fashion. A slight leak to the supply pressure, which possibly arises e.g. as a result of a defect, would be vented via the outlet seat of the relay valve.

The electromagnetic parking brake control device is also particularly preferably provided for a tractor vehicle-trailer combination and then has at least one connection for a trailer control valve, which connection can be connected to the connection for the at least one spring brake actuator.

Furthermore, at least one pressure sensor can be connected to the connection for the at least one spring brake actuator, and/or at least one pressure sensor can be connected to the control inlet of the relay valve, and/or at least one pressure sensor can be connected to the connection for the trailer control valve, which connection inputs a signal representing an actual pressure into the electronic control device.

The electronic control device can then be designed in such a way that, on the basis of a signal which represents an actual pressure and a signal which represents a valve for a setpoint pressure, it carries out a setpoint/actual value comparison within the scope of a pressure regulating process and/or a pressure plausibility check and/or determines the supply pressure which arises at the supply connection.

If, for example, a pressure sensor is connected to the work outlet of the relay valve, and therefore also can be or is connected to the connection for the at least one spring brake actuator or to the connection for the trailer control valve, the actual pressure can be determined there, and the operating state of the at least one spring brake actuator (released, applied or partially released or partially applied) can be determined therefrom. The same then also applies to the operating state of the trailer brakes, which can be determined from the actual pressure at the connection for the trailer control valve. Furthermore, a pressure regulating circuit is implemented in which the first solenoid valve device in conjunction with the relay valve forms the actuators.

If accordingly a pressure sensor is connected to the control inlet of the relay valve, the actual pressure which is adjusted by the solenoid valve device, in particular the actual pressure which is adjusted by the first and second 2/2-way solenoid valves can then be very quickly determined, which permits high dynamics of the pressure regulating circuit. Moreover, the operating state of the at least one spring brake actuator (released, applied or partially released or partially applied), as well as the actual brake pressure prevailing there, can also be determined approximately by taking into account the transmission behavior of the relay valve. The same then also applies to the operating state of the trailer brakes.

If accordingly a first pressure sensor is connected to the control inlet, and a second pressure sensor is connected to the working outlet of the relay valve, this permits troubleshooting by means of plausibility checking. For example, depending on the operating state the actual values of the first and second pressure sensors must have a specific relationship to one another taking into account specific tolerances. In this context, the troubleshooting or fault monitoring can be carried out quickly, completely and in a plurality of operating states. Furthermore, faster pressure regulation is possible than if only one pressure sensor is arranged at the working outlet of the relay valve or one pressure sensor is arranged at the control inlet of the relay valve.

If a further pressure sensor with the connection of the trailer control valve is connected together with a pressure sensor at the working outlet and/or at the control inlet of the relay valve, direct measurement of the supply pressure at the supply connection is thus possible in a plurality of operating states without the "drive" operating state having to be set. Furthermore, rapid troubleshooting is also possible by means of plausibility checking. For example, the actual pressures of the pressure sensors must indicate identical values if the solenoid valves are switched in such a way that a pressure connection comes about between the pressure sensors. As before, it is also possible to determine the supply pressure in a plurality of operating states. As a result, pressure regulation of the pressure at the connection for the trailer control valve is advantageously possible even if the "anti jackknife brake" is provided, in which only the trailer brakes but not the tractor vehicle brakes are applied in a metered fashion in order to extend the tractor vehicle-trailer combination.

According to one development, at least the relay valve, the solenoid valve device, the electronic control device, the at least one first throttle element, the at least one second throttle element, the at least one third throttle element and the supply connection, the connection for the at least one spring brake actuator and the parking brake signal connection can be embodied in one structural unit. This results in a compact structural unit which, as a basic module, can be expanded even further.

The invention also relates to a brake system of a vehicle, in particular to an electropneumatic parking brake device and, in particular, to an electronically regulated parking brake device (EPB), comprising an electropneumatic parking brake control device as described above.

Further measures which improve the invention are illustrated in more detail below together with the description of an exemplary embodiment of the invention and with reference to the drawing.

DETAILED DESCRIPTION OF THE DRAWINGS

Figure 1:
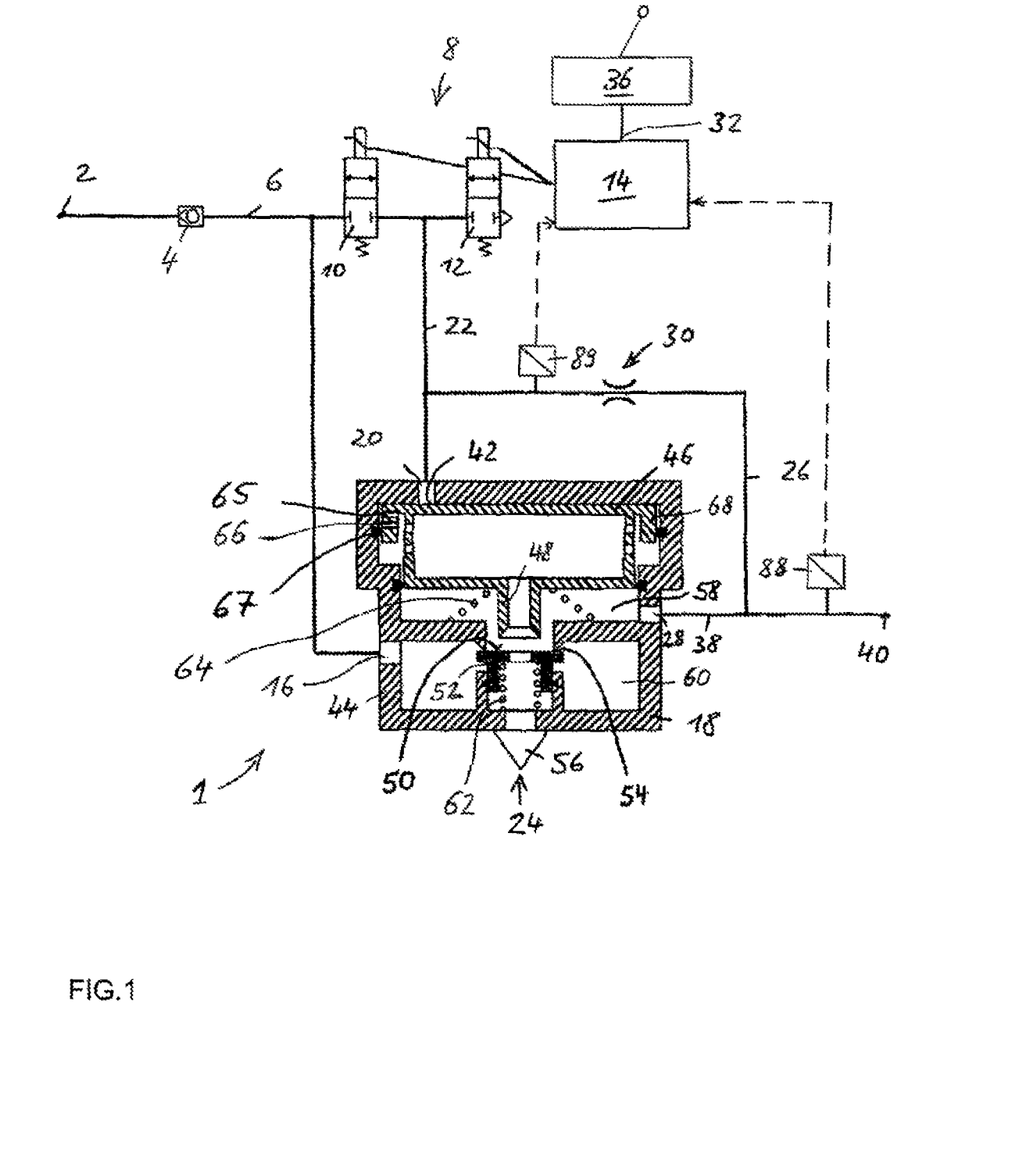
FIG. 1 shows a schematic circuit diagram of a preferred embodiment of an electropneumatic parking brake control device according to the invention.

FIG. 1 shows a schematic circuit diagram of a preferred embodiment of an electropneumatic parking brake control device 1. The electropneumatic parking brake control device 1 preferably represents a control device of an electropneumatic parking brake device of a tractor vehicle-trailer combination and is arranged on the tractor vehicle.

The electropneumatic parking brake control device 1 has a supply connection 2 which is protected by means of a nonreturn valve 4. A supply line 6 extends from the supply connection 2, on the one hand to a first solenoid valve device 8 with a first 2/2-way solenoid valve 10 as the inlet valve and a second 2/2-way solenoid valve 12 as the outlet valve. The first 2/2-way solenoid valve 10 is, like the second 2/2-way solenoid valve 12, located in the shown closed position when not energized, while both valves 10, 12 switch over into the open position when energized and are controlled by an electronic control device 14.

Furthermore, a supply inlet 16 of a relay valve is also connected to the supply connection 2 via the supply line 6. A pneumatic control inlet 20 of the relay valve 18 is connected via a control line 22 to the combination of the inlet valve 10 (first 2/2-way solenoid valve) and outlet valve 12 (second 2/2-way solenoid valve).

In particular, in the currentless closed position of the second 2/2-way solenoid valve 12 the connection between the control line 22 and the control inlet 20 of the relay valve 18 and a pressure sink 24 is interrupted, while this connection is connected in the energized open position. In an analogous fashion, in the currentless closed position of the first 2/2-way solenoid valve 10 the connection between the control line 22 or the control inlet 20 of the relay valve 18 and the supply connection 2 is interrupted, while this connection is connected in the energized open position.

Furthermore, a first throttle element 30, by which the flow cross-section of the feedback line 26 is constricted and the air mass flow between the working outlet and the pneumatic control inlet of the relay valve is limited or throttled by means of the flow cross-sectional constriction is connected into a feedback line 26 between a working outlet 28 of the relay valve 18 and the control inlet 20 of the relay valve 18.

The two 2/2-way solenoid valves 10, 12 are preferably prestressed under spring loading into their currentless position and are switched over by energization by means of the control device 14.

The working outlet 28 of the relay valve 18 is connected to a connection 40 for at least one spring brake actuator by means of a working line 38. Two spring brake actuators (not shown here) on the rear axle are preferably connected to this connection 40.

Depending on the switched position of the first 2/2-way-solenoid valve 10 and of the second 2/2-way solenoid valve 12 (inlet/outlet solenoid valve combination) the control line 22 or the control inlet 20 of the relay valve 18 is aerated or vented, so that aeration or ventilation by increasing the quantity of air by means of the relay valve 18 results in corresponding aeration or venting of the working outlet 28 and therefore of the connection 40 for the at least one spring brake actuator.

The relay valve 18 is firstly constructed in a widely known manner and comprises a control chamber 42 which is connected to the control line via the control inlet 20, a relay piston 46 which bounds the control chamber 42, can be moved in a housing and has a valve body 48 which is formed on the relay piston 46 or on its relay valve piston rod and, which forms an outlet valve of a double seat valve with an outlet seat 50 on a collar 52 which is also movably accommodated in the housing 44. Furthermore, the relay valve 18 comprises an inlet seat 54 which is formed on the housing 44 and against which the collar 52 is pretensioned and forms together with said inlet seat 54 an inlet valve of the double seat valve. The collar 52 also has a central drilled throughhole which, when the relay piston 46 is lifted off from the collar 52, connects a venting means 56 to a working chamber 58 which is connected to the working outlet 28 in order to vent the latter. On the other hand, when the collar 52 is lifted off from the inlet seat 54, a supply chamber 60 which is connected to the supply inlet 16 is connected to the working chamber 58 in order to ventilate the working outlet 28. The position of the relay piston 46 which, with its valve body 48, can press the collar 52 downward in order to lift it off from the inlet seat 54 is accordingly determined by the pressure at the control inlet 20 or in the control chamber 42. Finally, the collar 52 is forced against the inlet seat 54 by means of a collar spring 62. Moreover, a relay piston spring 64 forces the relay piston 46 away from the outlet seat 50 in the direction of the control chamber 42 by means of the force $F_F$.

The switched states of the two 2/2-way solenoid valves 10, 12 are determined by the control device 14, in particular in accordance with the parking brake signals which are present at the parking brake signal connection 32. For this purpose, the parking brake signal generator 36 is designed in such a way that it modulates parking brake signals in accordance with activation, which signals represent the operating states which are described further below.

The control device can also be connected to a vehicle data bus (not illustrated in the figures) via the parking brake signal connection or via a further signal connection, via which vehicle data bus the digital data can be received from other control devices and transmitted thereto. Instead of parking brake signals being input by the or in addition to the parking brake signal generator 36 which can be operated manually by the driver, parking brake signals can also be input into the control device 14 by a further control device, for example via a vehicle data bus, for example by a driver assistance system such as, for example, by a starter aid system on slopes. By means of signals which are received via such a vehicle data bus, parking brake signals can then be generated by the control device 14 itself. For example, the parking brake can be automatically applied if the vehicle has come to a standstill, or can be released automatically if it is detected that the vehicle is to drive away.

Against this background, the method of functioning of the electromagnetic parking brake control device 1 is as follows:

In the basic state (shown in FIG. 1) of the electropneumatic parking brake control device 1 both the first 2/2-way solenoid valve 10 and the second 2/2-way solenoid valve 12 are unenergized so that the control inlet 20 is always connected to the working outlet 28 of the relay valve 18 via the first throttle element 30. The feedback is therefore stable, and pressurized air cannot pass from the supply connection 2 to the control inlet 20 of the relay valve 18 or escape from the latter to the pressure sink 24. Therefore, the pressure which is currently prevailing at the connection 40 is also kept constant for the at least one spring brake actuator, and as a result also its applied position or release position.

If the pressure at the connection 40 for the at least one spring brake actuator is then to be increased in response to a corresponding parking brake signal, for example in the "activate parking brake with a specific brake pressure value" operating state within the scope of an emergency braking function or auxiliary braking function, the first 2/2-way solenoid valve 10 is switched into the open position by energizing it, and as a result the pressure in the control chamber 42 of the relay valve 18 is increased. This takes place, in particular, by pulsing the first 2/2-way solenoid valve 10.

The relay piston 46 then moves downward, and opens the inlet seat 54 of the double seat valve and allows supply pressure to flow into the working chamber 58. Then, the relay piston 46 moves back as far as its neutral position in which the inlet seat 54 and the outlet seat 50 of the double seat valve are closed.

However, if for example a relatively low pressure is to be applied at the connection 40 for the at least one spring brake actuator in the "activate parking brake with a specific brake pressure valve" operating state within the scope of an emergency braking function or auxiliary braking function in response to a corresponding parking brake signal, the control pressure in the control chamber 42 is preferably lowered by pulsing the second 2/2-way solenoid valve 12.

The relay piston 46 then moves in the direction of the control chamber 42 and vents the working chamber 58 via the outlet seat 50 of the double seat valve until an equilibrium of forces is restored, in response to which the relay piston 46 returns to the neutral position.

Since the same pressures do not generally prevail during the open-loop or closed-loop pressure control, as described above, in the control chamber 42 and in the working chamber 58 and a certain quantity of air always flows in the direction of the lower pressure via the first throttle element 30, component of the changing pressure resulting therefrom is preferably compensated in the control chamber 42 by corresponding pulsed control of the first 2/2-way solenoid valve 10 or of the second 2/2-way solenoid valve 12. This applies both to increasing the pressure, reducing the pressure and maintaining the pressure, even if the precise supply pressure or atmospheric pressure are not to prevail at the connection 40 for the at least one spring brake actuator.

In order to bring about the "drive" operating state in response to a corresponding parking brake signal, the first 2/2-way solenoid valve 10 is, for example, energized over a relatively long time. As a result, the control chamber 42 is aerated, even if at first a relatively small part of the air which is conducted from the first 2/2-way solenoid valve 10 to the control chamber flows away into the working chamber through the throttle element (30). The pressure in the working chamber 58 then rises more quickly than in the control chamber 42 until it ultimately exceeds it. Then, air flows from the working chamber 58 into the control chamber 42 via the feedback line 26 and the first throttle element 30 so that the process reinforces itself.

As a result, the relay piston 46 is forced in a stable fashion into its lower end position which points to the working chamber 58, so that said relay piston 46 continuously opens the inlet seat 54 of the double seat valve and connects the working chamber 58 to the supply connection 2.

Since the control chamber 42 is then continuously supplied with supply pressure via the first throttle element 30, the working chamber 58 and the inlet seat 54, the first 2/2-way solenoid valve 10 can also be de-energized in order to switch into its closed position.

In order to bring about the "park" operating state, the second 2/2-way solenoid valve 12 is energized over a certain time period. As a result, the control chamber 42 is aerated until atmospheric pressure prevails there. Then, the relay piston 46 moves in the direction of the control chamber 42 and vents the working chamber 58 via the outlet seat 50 of the double seat valve.

The relay piston spring 64 which loads the relay piston 46 ensures that it moves as far as its upper end position and stays there, as a result of which the outlet seat 50 is continuously completely opened. Since the control chamber 42 is then continuously connected to the atmosphere via the throttle element 30, the working chamber 58 and the opened outlet seat 50, the second 2/2-way solenoid valve 12 can be de-energized and therefore moved into its closed position.

In order to assume the "park" state in a stable fashion in any case in the event of a power failure during the execution of an emergency braking function or auxiliary braking function, a second throttle element 65 is provided. This ensures that in the event of a power failure during the execution of the emergency braking function or auxiliary braking function the control pressure in the control chamber 42 of the relay valve 18 drops, as a result of which the brake pressure in the spring-loaded brakes drops and accordingly the "park" state can be assumed in a stable fashion.

The second throttle element 65 is preferably formed by a radial drilled through-hole in an outer lateral wall 68 of the relay piston 46. In this context, the diameter of the drilled through-hole represents the flow cross-section or throttle cross-section of the second throttle element 65. Instead of a single drilled through-hole 65, a plurality of drilled through-holes can also be provided, for example distributed over the circumference in the lateral wall 68.

In order to avoid undesired release of the applied parking brake in the event of possibly occurring leaks with respect to a region conducting a supply pressure, a third throttle element 66 is then provided. The third throttle element 66 is preferably formed by a plurality of radial drilled-through-holes, arranged distributed over the circumference of the lateral wall 68 of the relay piston 46, in the outer lateral wall 68. In this context, the sum of the diameters of the drilled through-holes forms the flow cross-section or throttle cross-section of the third throttle element 66. Instead of a plurality of small drilled through-holes 66, just a single relatively large drilled through-hole can also be provided in the lateral wall 68.

In this context, the second throttle element 65 and the third throttle element 66 are arranged one behind the other when viewed in the axial direction of movement 70 of the relay piston 46.

Furthermore, an element 67 which is secured to the relay valve housing 44 is provided, which element 67 interacts with the second throttle element 65 and with the third throttle element 66 in such a way that depending on the position of the relay piston 46 within the relay valve housing 44 the control chamber 42 is connected to the venting means 56 via the second throttle element 65 and via the third throttle element 66 or such a connection is blocked.

In particular, the element which is secured to the relay valve housing 44, is formed here, for example, by a relay piston seal 67 against which the lateral wall 68 of the relay piston 46 forms a seal.

Figure 2:
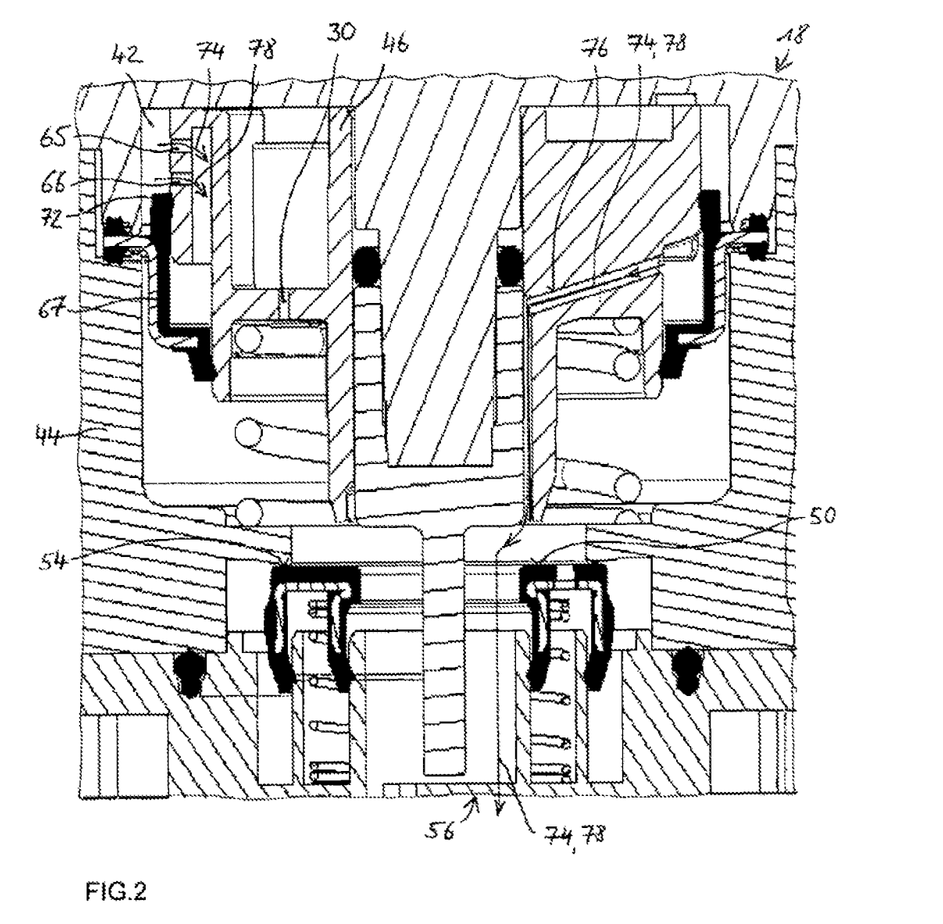
FIG. 2 shows a schematic cross-sectional illustration of a relay valve of the electropneumatic parking brake control device from FIG. 1 in the "park" or "parking brakes" position.
Figure 3:
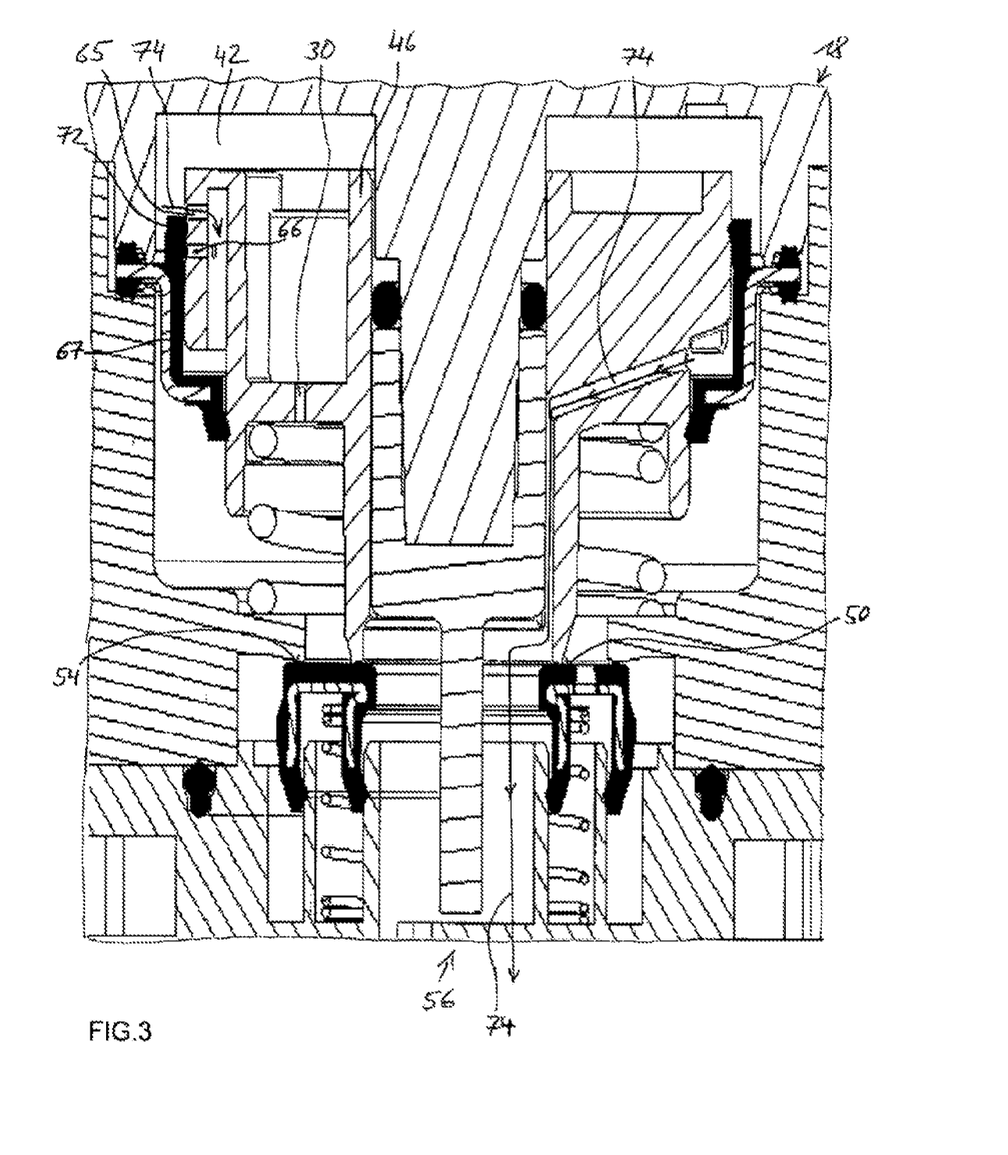
FIG. 3 shows a schematic cross-sectional illustration of the relay valve of the electropneumatic parking brake control device from FIG. 1 in an "activate parking brake with a specific brake pressure value" position within the scope of an emergency braking function or auxiliary braking function.
Figure 4:
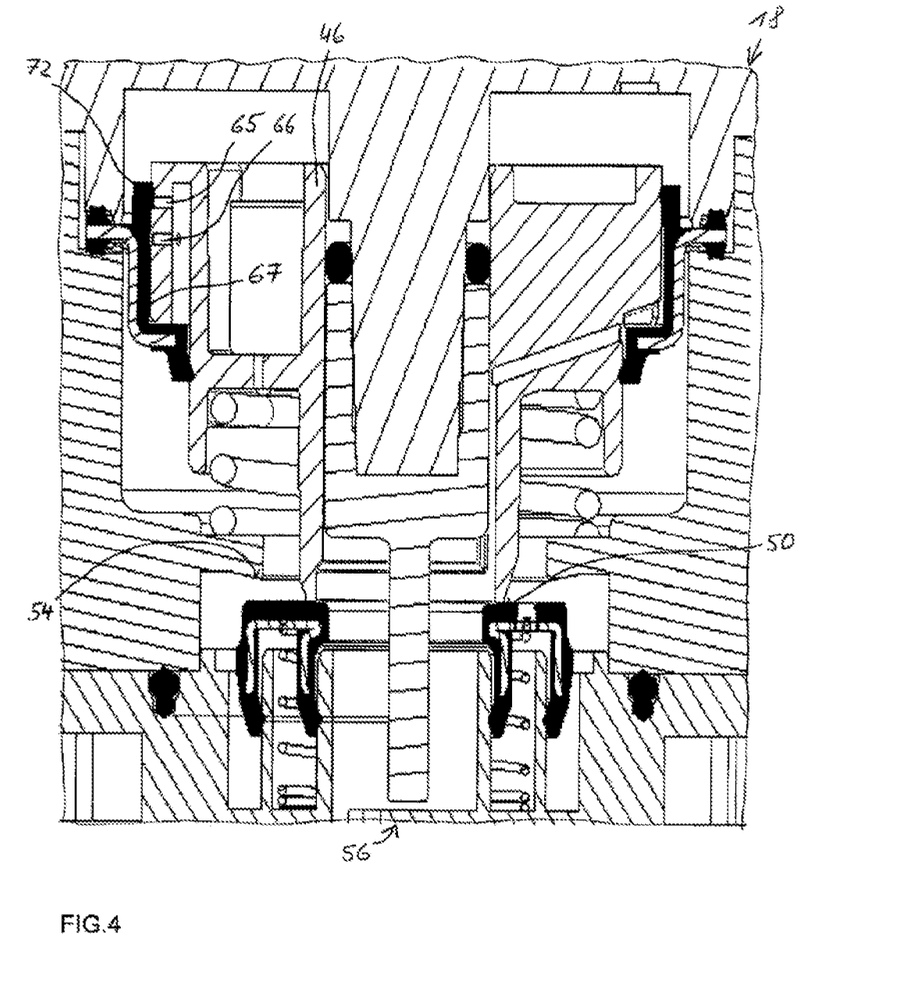
FIG. 4 shows a schematic cross-sectional illustration of the relay valve of the electropneumatic parking brake control device from FIG. 1 in the "drive" position.

As is apparent, in particular, from FIG. 2 to FIG. 4, a region of the relay valve 18 which is located on this side of an end 72 of the relay piston seal 67 facing the control chamber 42 is connected to the control chamber 42.

If the drilled through-hole 65 forming the second throttle element at least partially projects, when viewed in the axial direction of movement 70 of the relay piston 46, beyond the end 72, facing the control chamber 42, of the relay piston seal 76 in the direction of the control chamber 42, the control chamber 42 is connected to the venting means 56 via the second throttle element 65, as shown in FIG. 2, which shows the venting position of the relay piston 46 in the "park" state. In the venting position of the relay piston 46, the outlet seat 50 is completely opened and the inlet seat 54 is completely closed.

There is then a flow connection, indicated by the arrow 74 in FIG. 2, between the control chamber 42 and the venting means 56 via the drilled through-hole 65, a, for example here, oblique transverse drilled hole 76 in the relay piston 46 and via the then opened outlet seat 50 of the double seat valve.

The same also applies to the intermediate position, shown in FIG. 3, of the relay piston 46 which corresponds to the "activate parking brake with a specific brake pressure value" state within the scope of the emergency braking function or auxiliary braking function. Then, either the outlet seat 50 is partially opened and the inlet seat 54 is partially closed in order to increase the parking braking force, or the outlet seat 50 is completely closed and the inlet seat 54 is partially opened in order to reduce the parking braking force. After a certain time, both the outlet seat 50 and the inlet seat 54 are closed owing to the equilibrium of forces which then occur at the relay piston 46.

If, on the other hand, in the aeration position of the relay piston 46 which is shown in FIG. 4 the "drive" state is assumed and the relay piston is moved downward for (completely) opening the inlet seat 54 and for (completely) closing the outlet seat 50, the drilled through-hole 65 which forms the second throttle element is covered or closed off by the end 72 of the relay piston seal 67 so that the flow connection between the control chamber 42 and the venting means 56 via the second throttle element is blocked.

Consequently, a flow connection between the control chamber 42 and the venting means 56 through the second throttle element is only possible in the "park" state and in the "activate parking brake with a specific brake pressure value" state, but not in the "drive" state.

The intermediate position of the relay piston 46 which is shown in FIG. 3 is located, when viewed in the axial direction of movement of the relay piston 46, between the venting position of FIG. 2 ("park") and the aeration position of FIG. 4 ("drive").

Furthermore, the flow cross-section which is made available by the second throttle element 65 is smaller than the flow cross-section which is made available by the first throttle element 30. As a result, during an emergency braking operation or auxiliary braking operation in the case of a power failure in which the brake pressure which is set last electrically would continue to act, the brake pressure can drop as far as the application pressure of the spring-loaded brake, as a result of which even in the event of power failure during an emergency braking operation or auxiliary braking operation the "park" state is still assumed in a stable fashion.

Therefore, the problems described at the beginning with respect to case b) are eliminated.

The venting position of the relay piston 46 ("park") which is shown in FIG. 2 is consequently characterized in that the outlet seat 50 is completely opened and the inlet seat 54 of the double seat valve is completely closed, and as a result a pressure which corresponds to an application pressure of the at least one spring brake actuator in which said actuator is completely applied arises at the connection 40 for the at least one spring brake actuator.

The aeration position of the relay piston 46 ("drive") which is shown in FIG. 4 is, on the other hand, characterized in that the inlet seat 54 is completely opened and the outlet seat 50 is completely closed and as a result a pressure which corresponds to a release pressure of the at least one spring brake actuator in which said actuator is completely released arises at the connection 40 for the at least one spring brake actuator.

An intermediate position of the relay piston 46 which is shown in FIG. 3 is characterized in that a pressure which is higher than the application pressure but lower than the release pressure arises at the connection 40 for the at least one spring brake actuator.

As far as the third throttle element 66 and the drilled through-holes forming the latter are concerned, said holes are arranged in FIG. 1 to FIG. 4 underneath the drilled-through-hole which forms the second throttle element 65, in such a way that a flow connection between the control chamber 42 and the venting means 56 via the third throttle element 66 and transverse drilled hole 76 can, as illustrated by the arrow 78 in FIG. 2, come about only in the venting position of the relay piston 46, which corresponds to the "park" state.

Because in addition the flow cross-section which is made available by the third throttle element 66 is larger than the flow cross-section which is made available by the first throttle element 30, in the "park" state, i.e. in the venting position of the relay valve 46, undesired release of the applied parking brake in the case of possibly occurring leaks of, for example, the inlet valve (first 2/2-way solenoid valve) 10 are avoided.

However, because the third throttle element 66 in the form of the drilled through-holes 66 is not covered by the end 72 of the relay piston seal and therefore closed off merely in the venting position of the relay piston 46 and therefore in the "park" state, but is already in the emergency braking case and in the auxiliary braking case and in the "drive" state, a flow connection between the control chamber 42 and the venting means 56 via the third throttle element 66 is possible only exclusively in the "park" state, however not in the emergency braking case and auxiliary braking case (FIG. 3) and in the "drive" state (FIG. 4).

The relay piston 46 with the second throttle element 65 and the third throttle element 66 is embodied in each case as drilled-through-holes in its lateral wall 68, and therefore forms a slide of a slider valve, wherein depending on the position of the relay piston 46 with respect to the end 72 of the relay piston seal 76 a flow connection comes about between the control chamber 42 and the venting means 56 or not. In this context, the end of the relay piston seal 67 which is secured to the relay valve housing 44 opens or closes the second throttle element 65 and/or the third throttle element 66 depending on the position of the relay valve piston 46.

If actuation of a trailer control valve by means of the electropneumatic parking brake control device 1 is provided, this actuation can be executed in such a way that the pressure which arises at the connection 40 for the at least one spring brake actuator is conducted at the same time to a connection for a trailer control valve.

According to one embodiment, the electronic control device 14 is designed in such a way that on the basis of a signal representing an actual pressure and of a parking brake signal representing a value for a setpoint pressure it carries out a setpoint/actual value comparison within the scope of a pressure regulating process and/or a pressure plausibility check and/or determination of the supply pressure which arises at the supply connection 2.

If, for example, a pressure sensor 88 at the working outlet 28 of the relay valve 18 is closed and therefore can also be or is also connected to the connection 40 for the at least one spring brake actuator or to the connection 66 for the trailer control valve, the actual pressure can thus be determined there and the operating state of the at least one spring brake actuator (released, applied or partially released or partially applied) can be determined therefrom. The same then also applies to the operating state of the trailer brakes, which state can be determined from the actual pressure at the connection for the trailer control valve. Furthermore, it is then possible to implement a pressure regulating circuit in which the solenoid valve device 8 forms, in conjunction with the relay valve 18, the actuator elements. However, if the pressure sensor 88 is used exclusively, the pressure regulator does not however detect pressure deviations until a deviation has already occurred in the working outlet pressure of the relay valve 18. This can lead to increased consumption of pressurized air.

If a pressure sensor 89 is connected to the control inlet 20 of the relay valve, the actual pressure which is applied by the first and second 2/2-way solenoid valves 10, 12 can be determined very quickly, which results in high dynamics of the pressure regulating circuit. Furthermore, the operating state of the at least one spring brake actuator (released, applied or partially released or partially applied) and the actual brake pressure prevailing there can also be determined, but with less accuracy compared to the use of the pressure sensor 88, since the response behavior and hysteresis of the relay valve 18 are included as errors. The same then also applies to the operating state of the trailer brakes. When the pressure sensor 89 is used, the pressure regulator can particularly advantageously compensate pressure deviations in the control chamber 42 so precisely that they do not lead to pressure deviation at the working outlet of the relay valve.

If a first pressure sensor 88 is connected to the working outlet 28, and a second pressure sensor 89 is connected to the control inlet of the relay valve 18, this also permit troubleshooting by means of plausibility checking. For example, the actual pressure values of the first and second pressure sensors 88, 89 must be in a specific relationship with respect to one another depending on the operating state, taking into account specific tolerances. In this context, the troubleshooting or fault monitoring can be carried out quickly, completely and in a plurality of operating states. Furthermore, faster pressure regulation with less consumption of pressurized air occurs than if just one pressure sensor 88 is arranged at the working outlet 28 of the relay valve 18, and more precise pressure regulation of the working outlet pressure occurs than if just one pressure sensor 89 is arranged at the control inlet 20 of the relay valve 18.

According to one embodiment, the relay valve 18, the first solenoid valve device 8 (first and second 2/2-way solenoid valves 10, 12), the nonreturn valve 4, the first throttle element 30, the electronic control device 14 and the supply connection 2, the connection 2 for the at least one spring brake actuator and the parking brake signal connection 32 can be embodied in one structural unit, which constitutes here a basic module which can be expanded. Furthermore, at least one pressure sensor 88 and/or 89 can be integrated into the basic module or the structural unit 92. Furthermore, of course the electrical and pneumatic lines which connect the specified components to one another pneumatically or electrically are also integrated into the structural unit. The structural unit or the basic module can have a single housing or be composed of a plurality of housings or housing parts which are connected to one another in a releasable or nonreleasable fashion.

It is also to be mentioned that a combination of the electropneumatic parking brake control device with another electronically controlled vehicle system to form one structural unit can be advantageous, since one common electronic control device can be provided. In particular, the combination with an air conditioning system provides advantages, since the supply line to the electropneumatic parking brake control device can also be dispensed with here.

It is possible to combine features of different embodiments of the invention, and this is suggested herewith.

LIST OF REFERENCE SYMBOLS

1 Brake control device
2 Supply connection
4 Nonreturn valve
6 Supply line
8 Solenoid valve device
10 First 2/2-way solenoid valve
12 Second 2/2-way solenoid valve
14 Control device
16 Supply inlet
18 Relay valve
20 Control inlet
22 Control line
24 Pressure sink
26 Feedback line
28 Working outlet
30 First throttle element
32 Parking brake signal connection
34 Signal line
36 Parking brake signal generator
38 Working line
40 Connection for spring brake actuator
42 Control chamber
44 Relay valve housing
46 Relay piston
48 Valve body
50 Outlet seat
52 Collar
54 Inlet seat
56 Vent
58 Working chamber
60 Supply chamber
62 Collar spring
64 Relay piston spring
65 Second throttle element
66 Third throttle element
67 Relay piston seal
68 Lateral wall
70 Axial direction of movement
72 End
74 Arrow
76 Transverse drilled hole
78 Arrow
88 First pressure sensor
89 Second pressure sensor

What is claimed is:

1. An electropneumatic parking brake control device for controlling a parking brake having at least one spring brake actuator, comprising:
a) a connection for the at least one spring brake actuator,
b) a solenoid valve device which is controllable by an electronic control device,
c) a relay valve whose pneumatic control inlet is connected at one end to the solenoid valve device and at the other end to a working outlet and to the connection for the at least one spring brake actuator,
d) a supply connection for at least one pressurized air supply which is connected at one end to the solenoid valve device and at the other end to a supply inlet of the relay valve,
e) a feedback line through which the working outlet and the pneumatic control inlet of the relay valve are connected to one another, wherein
f) the relay valve has a control chamber which is connected to the pneumatic control inlet, at least one relay piston which is controlled by the pressure in the control chamber and activates a double seat valve, and a working chamber which is connected to the working outlet, wherein the relay piston is guided within a relay valve housing and bounds the control chamber and the working chamber, and the double seat valve comprises at least one inlet seat and at least one outlet seat, wherein when the outlet seat is opened, the working chamber is connected to a vent, and when the inlet valve is opened said working chamber is connected to the supply inlet, and wherein
g) at least one first throttle element is arranged in the feedback line in such a way that the working outlet and the pneumatic control inlet of the relay valve always have a throttled flow connection to one another, and wherein
h) the control chamber of the relay valve is connected to the vent via at least one second throttle element exclusively when the relay piston is in a venting position or in an intermediate position, but the connection of the control chamber to the vent is interrupted by the at least one second throttle element if the relay piston is in an aeration position, wherein
h1) the venting position of the relay piston within the relay valve housing is characterized in that the outlet seat is completely opened and the inlet seat of the double seat valve is completely closed, and as a result a pressure arises at the connection for the at least one spring brake actuator, which pressure corresponds to an application pressure of the at least one spring brake actuator, at which pressure said actuator is completely applied, and wherein
h2) the aeration position of the relay piston within the relay valve housing is characterized in that the inlet seat is completely opened and the outlet seat is completely closed, and as a result a pressure arises at the connection for the at least one spring brake actuator, which pressure corresponds to a release pressure of the at least one spring brake actuator, at which pressure said actuator is completely released, and wherein
h3) the intermediate position of the relay piston within the relay valve housing is characterized in that a pressure arises at the connection for the at least one spring brake actuator, which pressure is higher than the application pressure but lower than the release pressure, and further wherein i) the control chamber of the relay valve is connected to the vent via at least one third throttle element exclusively when the relay piston is in the venting position, but the connection between the control chamber and the vent is interrupted by the at least one third throttle element if the relay piston is in the aeration position or in the intermediate position, and wherein j) a flow cross-section which is made available by the at least one third throttle element is larger than a flow cross-section which is made available by the at least one first throttle element, and k) a flow cross-section which is made available by the at least one second throttle element is smaller than the flow cross-section which is made available by the at least one first throttle element.

2. The electropneumatic parking brake control device as claimed in claim 1, wherein
the at least one second throttle element and/or the at least one third throttle element comprise at least one drilled through-hole in a wall of the relay piston, and
an element which is secured to the relay valve housing is provided, which element interacts with the at least one second throttle element and/or with the at least one third throttle element in such a way that depending on the position of the relay valve within the relay valve housing the control chamber is connected to the vent via the at least one second throttle element and/or via the at least one third throttle element, or such a connection is blocked.

3. The electropneumatic parking brake control device as claimed in claim 2, wherein
a throttle cross-section of the at least one second throttle element and/or a throttle cross-section of the at least one third throttle element is formed by the at least one drilled through-hole.

4. The electropneumatic parking brake control device as claimed in claim 2, wherein
a region on a side of an end, facing the control chamber, of the element which is secured to the relay valve housing is connected to the control chamber, wherein
a) if the at least one drilled through-hole projects at least partially beyond the end in the direction of the control chamber, the control chamber is connected to the vent via the at least one second throttle element and/or via the at least one third throttle element, and
b) if the at least one drilled through-hole does not project beyond the end in the direction of the control chamber, such a connection is blocked.

5. The electropneumatic parking brake control device as claimed in claim 2, wherein
the element which is secured to the relay valve housing comprises at least one relay piston seal which is secured to the relay valve housing and against which a lateral wall of the relay piston, in which the at least one drilled through-hole is formed, forms a seal.

6. The electropneumatic parking brake control device as claimed in claim 1, wherein
the relay piston is loaded into the venting position by a spring means.

7. The electropneumatic parking brake control device as claimed in claim 1, wherein
the electronic control device is connected to an electrical parking brake signal connection for an electric parking brake signal generator, via which parking brake signal connection parking brake signals are input into the electronic control device.

8. The electropneumatic parking brake control device as claimed in claim 7, wherein
the solenoid valve device comprises two 2/2-way solenoid valves each with a closed position and an open position, wherein
a first 2/2-way solenoid valve is connected as an inlet valve between the pneumatic control inlet of the relay valve and the supply connection, and
a second 2/2-way solenoid valve is connected between the pneumatic control inlet of the relay valve and a pressure sink.

9. The electropneumatic parking brake control device as claimed in claim 8, wherein
the first 2/2-way solenoid valve and the second 2/2-way solenoid valve each have a currentless closed position and an energized open position.

10. The electropneumatic parking brake control device as claimed in claim 8, wherein
when a parking brake signal which represents a "drive" state is input into the electronic control device or generated in the electronic control device, the second 2/2-way solenoid valve is controlled by the electronic control device into the closed position, and the first 2/2-way solenoid valve is firstly controlled into the open position and then into the closed position.

11. The electropneumatic parking brake control device as claimed in claim 8, wherein
when a parking brake signal which represents an "activate parking brake with a specific brake pressure value" state is input into the electronic control device or generated in the electronic control device, the electronic control device controls the first 2/2-way solenoid valve and/or the second 2/2-way solenoid valve into the closed position or into the open position depending on the respective brake pressure value.

12. The electropneumatic parking brake control device as claimed in claim 11, wherein
the electronic device controls the first 2/2-way solenoid valve and/or the second 2/2-way solenoid valve alternately or in a pulsed fashion into the closed position and into the open position.

13. The electropneumatic parking brake control device as claimed in claim 8, wherein
when a parking brake signal which represents a "park" or "parking brakes" state is input into the electronic control device or generated in the electronic control device, the electronic control device controls the first 2/2-way solenoid valve into the closed position, and firstly controls the second 2/2-way solenoid valve into the open position and then controls the second 2/2-way solenoid valve into the closed position.

14. The electropneumatic parking brake control device as claimed in claim 1, wherein
at least one pressure sensor with the connection for the at least one spring brake actuator, and/or at least one pressure sensor with the pneumatic control inlet of the relay valve, inputs a signal which represents an actual pressure into the electronic control device.

15. The electropneumatic parking brake control device as claimed in claim 14, wherein
the electronic control device is configured such that, on the basis of the signal which represents the actual pressure and a signal which represents a value for a setpoint pressure, a setpoint/actual comparison is carried out within the scope of a pressure regulating process and/or a pressure plausibility check, and/or determines the supply pressure which arises at the supply connection.

16. The electropneumatic parking brake control device as claimed in claim 1, wherein
the supply connection is secured by a nonreturn valve.

17. A brake system of a vehicle comprising an electropneumatic parking brake control device as claimed in claim 1.

18. The brake system as claimed in claim 17, wherein
the brake system is an electropneumatic parking brake for the vehicle.

* * * * *